(12) United States Patent
Colle et al.

(10) Patent No.: US 7,500,175 B2
(45) Date of Patent: Mar. 3, 2009

(54) ASPECTS OF MEDIA CONTENT RENDERING

(75) Inventors: Olivier Colle, Redmond, WA (US); James C. Finger, Kirkland, WA (US); Khurshed Mazhar, Kirkland, WA (US); Mark D. VanAntwerp, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 11/405,816

(22) Filed: Apr. 18, 2006

(65) Prior Publication Data

US 2007/0006064 A1  Jan. 4, 2007

Related U.S. Application Data

(60) Provisional application No. 60/695,944, filed on Jul. 1, 2005.

(51) Int. Cl.
  *G06F 17/00* (2006.01)
(52) U.S. Cl. .......................................... 715/201; 700/88
(58) Field of Classification Search .................. 715/201; 700/88; 375/240.01
  See application file for complete search history.

(56) References Cited

U.S. PATENT DOCUMENTS 5,659,539 A * 8/1997 Porter et al. ................. 709/231
6,385,596 B1 * 5/2002 Wiser et al. .................... 705/51
6,414,686 B1 * 7/2002 Protheroe et al. ........... 345/474
2003/0078930 A1 * 4/2003 Surcouf et al. ................ 707/10
2003/0093792 A1 * 5/2003 Labeeb et al. ................. 725/46
2004/0223740 A1 * 11/2004 Itoi ............................. 386/95

OTHER PUBLICATIONS

Slingerland, Nathan, et al, "Cache Performance for Multimedia Applications", ICS '01: Proceedings of the 15th International Conference on Supercomputing, Jun. 2001, pp. 1-14.*

* cited by examiner

*Primary Examiner*—Laurie Ries
(74) *Attorney, Agent, or Firm*—Mayer & Williams PC

(57) ABSTRACT

Media content is arranged into a number of sets of video, audio, or data samples, referred to as clips, which are rendered by a media content manager. A playlist, which is handled by a presentation manager, specifies the time-ordered sequence of clips playable to a user. Certain actions are taken during media content play to minimize glitches perceived by the user, including determining a time offset value that is used to decide how far in advance of a scheduled play time to begin pre-rendering an upcoming clip. The time offset value is determined using one or more static characteristics associated with a media source for the upcoming clip, such as the location of the media source, codec parameters, or encryption complexity, and one or more dynamic characteristics of the presentation system, such as retrieval states, (including play speeds) of media clips, processing loads, or clock frequencies.

19 Claims, 8 Drawing Sheets

ASPECTS OF MEDIA CONTENT RENDERING

STATEMENT OF RELATED APPLICATION

This application claims the benefit of provisional application No. 60/695,944, filed Jul. 1, 2005, which is incorporated by reference herein.

BACKGROUND

Multimedia players are devices that render combinations of video, audio or data content ("multimedia presentations") for consumption by users. Multimedia players such as DVD players currently do not provide for much, if any, user interactivity during play of media content—media content play is generally interrupted to receive user inputs other than play speed adjustments. For example, a user of a DVD player must generally stop the movie he is playing to return to a menu that includes options allowing him to select and receive features such as audio commentary, actor biographies, or games.

Interactive multimedia players are devices (such devices may include hardware, software, firmware, or any combination thereof) that render combinations of interactive content concurrently with traditional video, audio or data content ("interactive multimedia presentations"). Interactive content is generally any user-selectable visible or audible object presentable alone or concurrently with other video, audio or data content. Although any type of device may be an interactive multimedia player, devices such as optical media players (for example, DVD players), computers, and other electronic devices are particularly well positioned to enable the creation of, and consumer demand for, commercially valuable interactive multimedia presentations because they provide access to large amounts of relatively inexpensive, portable data storage.

To enhance investment in all types of media content players, particularly interactive multimedia players and interactive multimedia presentations, it is desirable to provide predictable and relatively glitch-free play of video, audio or data content.

It will be appreciated that the claimed subject matter is not limited to implementations that solve any or all of the disadvantages of specific multimedia presentation systems, interactive multimedia presentation systems, or aspects thereof.

SUMMARY

Many types of presentations, such as multimedia presentations and interactive multimedia presentations, include media content. One example of media content is a movie, but media content may be video, audio, data, or any combination thereof. Media content is generally arranged into a number of sets of samples, referred to as clips, which are rendered by a media content manager. One clip is generally receivable from one media source. A playlist, which is handled by a presentation manager, specifies the time-ordered sequence of clips that are presentable to a user. Sometimes, a real-time transition from one clip to another as specified in the playlist is difficult to perform without causing the user to experience glitches (for example, delays, undesirable interruptions, or dropped content) in the play of the media content, especially when presentation systems with limited processing and/or decoding resources are used.

Methods, systems, apparatuses, and articles of manufacture for playing media content that are discussed herein involve pre-rendering at least a portion of an upcoming clip before the clip is scheduled for play, to minimize glitches during play of the media content. Certain actions taken during play of the media content include determining a time offset value, which is used to decide how far in advance of the scheduled play time to begin pre-rendering the upcoming clip. There should be enough time for pre-rendering the clip before the scheduled play time, but the clip should not be pre-rendered so far in advance that pre-rendering activities negatively affect other important activities occurring within the presentation system.

The time offset value is determined using one or more static characteristics associated with the media source for the upcoming clip, and one or more dynamic characteristics of the presentation system. Examples of static characteristics of a particular media source include the location of the media source, codec parameters or settings, or encryption parameters or settings. Examples of dynamic characteristics of the presentation system include retrieval states (including play speeds) of media clips, media or graphics processing loads, or media or graphics clock frequencies. The time offset value may be determined multiple times during play of the media content to account for various dynamic characteristics.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter.

DETAILED DESCRIPTION

Figure 1:
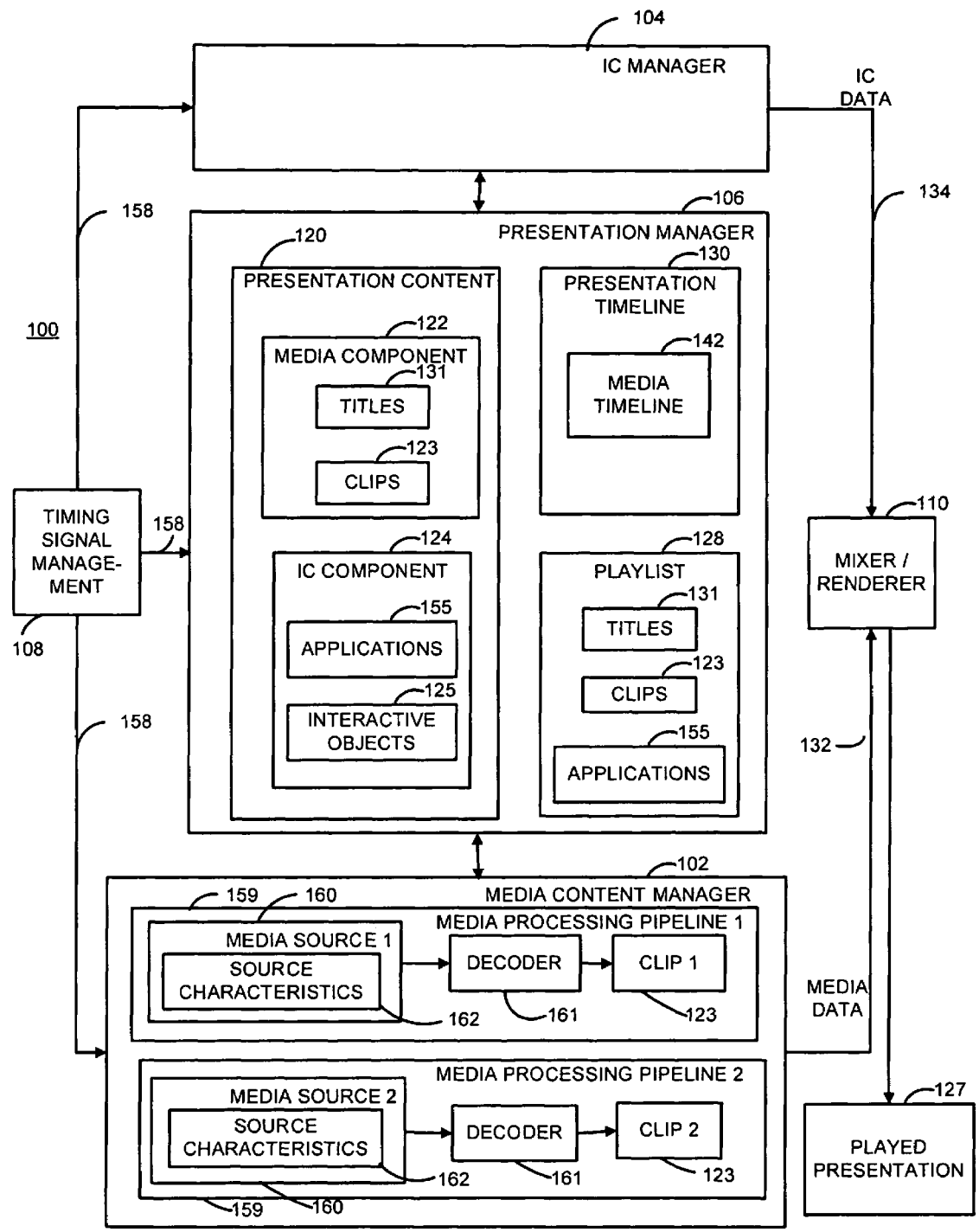
FIG. 1 is a simplified functional block diagram of an interactive multimedia presentation system.

Turning to the drawings, where like numerals designate like components, FIG. 1 is a simplified functional block diagram of an interactive multimedia presentation system ("Presentation System") 100. Presentation System 100 includes a media content manager 102, an interactive content ("IC") manager 104, a presentation manager 106, a timing signal management block 108, and a mixer/renderer 110. In general, design choices dictate how specific functions of Presentation System 100 are implemented. Such functions may be implemented using hardware, software, or firmware, or combinations thereof.

In operation, Presentation System 100 handles interactive multimedia presentation content ("Presentation Content") 120. Presentation Content 120 includes a media content component ("media component") 122 and an interactive content component ("IC component") 124. Media component 122 and IC component 124 are generally, but need not be, handled as separate data streams, by media content manager 102 and IC manager 104, respectively.

Presentation System 100 also facilitates presentation of Presentation Content 120 to a user (not shown) as played presentation 127. Played Presentation 127 represents the visible and/or audible information associated with Presentation Content 120 that is produced by mixer/renderer 110 and receivable by the user via devices such as displays or speakers (not shown). For discussion purposes, it is assumed that Presentation Content 120 and played presentation 127 represent high-definition DVD movie content, in any format. It will be appreciated, however, that Presentation Content 120 and Played Presentation 127 may be any type of presentation of media content now known or later developed.

Media component 122 represents the traditional video, audio or data components of Presentation Content 120. For example, a movie generally has one or more versions (a version for mature audiences, and a version for younger audiences, for example); one or more titles 131 with one or more chapters (not shown) associated with each title (titles are discussed further below, in connection with presentation manager 106); one or more audio tracks (for example, the movie may be played in one or more languages, with or without subtitles); and extra features such as director's commentary, additional footage, trailers, and the like. It will be appreciated that distinctions between titles and chapters are purely logical distinctions. For example, a single perceived media segment could be part of a single title/chapter, or could be made up of multiple titles/chapters. It is up to the content authoring source to determine the applicable logical distinctions. It will also be appreciated that although media component 122 is referred to as a movie, media component 122 may in fact be video, audio, data, or any combination thereof.

Sets of media samples (for example, sets of video, audio, or data samples) that form media component 122 are referred to as clips 123 (clips 123 are shown within media component 122, media content manager 102, and playlist 128). Referring to media content manager 102, information associated with clips 123 is handled by one or more media processing pipelines 159 (two media processing pipelines are shown for exemplary purposes, but any number are possible). Within a particular media processing pipeline 159, information associated with clips 123 is received from a media source 160 and demultiplexed, decoded, and/or decrypted at a decoder block 161.

A particular media source 160 is any device, location, or data from which video, audio, or data is derived or obtained. Examples of media sources include, but are not limited to, networks, hard drives, optical media, alternate physical disks, and data structures referencing storage locations of specific video, audio, or data. In general, any computer-readable medium may serve as a media source (computer-readable media are discussed further below, in connection with FIG. 7).

Each media source 160 has one or more media source characteristics 162 associated therewith. A media source characteristic is a static parameter associated with a particular media source. Examples of such static parameters include, but are not limited to: the location of the media source; encoder-decoder pair ("codec") parameters or settings (for example, encoding/decoding formats or protocols such as WMV, H.264, MPEG, VC1, group of picture ("GOP") size settings, compression ratio settings, or quality settings); or encryption parameters or settings (for example, encryption type such as symmetric or asymmetric, encryption complexity, or encryption formats or protocols). It will be appreciated that other static parameters associated with a particular media source may also be defined or recognized.

Decoder blocks 161 represent any devices, techniques or steps used to retrieve renderable video, audio, or data content from information received from a media source 160. Decoder blocks 161 may include codecs, demultiplexers, or decrypters, for example. Decoder blocks 161 and components thereof may be implemented using hardware, software, firmware, or any combination thereof. Although a one-to-one relationship between decoders and media sources is shown, it will be appreciated that one decoder may serve multiple media sources, and vice-versa. For example, some commercially available DVD players include only one decoder.

Media content data ("media data") 132 is data associated with media component 122 that has been prepared for rendering by media content manager 102 and transmitted to mixer/renderer 110. Sets (for example, frames) of media data 134 generally include, for each active clip 123, a rendering of a portion of the clip. The exact portion or amount of the clip rendered in a particular set of media data may be based on several factors, such as the characteristics of the video, audio, or data content of the clip, or one or more media source characteristics 162. Media content manager 102 has a dynamic media processing load based on the identity and scheduling of the various clips comprising media component 122 and/or IC component 124 (discussed below).

Referring again to Presentation Content 120, IC component 124 includes interactive objects 125, which are user-selectable visible or audible objects, optionally presentable concurrently with media component 122, along with any instructions (shown as applications 155 and discussed further below) for presenting the visible or audible objects. Interactive objects 125 may be static or animated. Examples of interactive objects include, among other things, video samples or clips, audio samples or clips, graphics, text, and combinations thereof.

Interactive objects 125 originate from one or more sources (not shown). A source is any device, location, or data from which interactive objects are derived or obtained. Examples of sources for interactive objects 125 include, but are not limited to, networks, hard drives, optical media, alternate physical disks, and data structures referencing storage locations of specific interactive objects. Examples of formats of interactive objects 125 include, but are not limited to, portable network graphics ("PNG"), joint photographic experts group ("JPEG"), moving picture experts group ("MPEG"), multiple-image network graphics ("MNG"), audio video interleave ("AVI"), extensible markup language ("XML"), hypertext markup language ("HTML"), extensible HTML ("XHTML"), extensible stylesheet language ("XSL"), and WAV.

Applications 155 provide the mechanism by which Presentation System 100 presents interactive objects 125 to a user. Applications 155 represent any signal processing method or stored instruction(s) that electronically control predetermined operations on data. It is assumed for discussion purposes that IC component 124 includes three applications 155, which are discussed further below in connection with FIGS. 2 and 3. The first application presents, concurrently with visual aspects of the movie, certain interactive objects that provide a menu having multiple user-selectable items; the second application presents one or more interactive objects that provide graphic overlays (such as circles) that may be used to identify and/or follow one or items appearing in the movie (a person, a car, a building, or a product, for example); and the third application presents a media clip such as an animated thumbnail (referred to as a "script clip").

Interactive content data ("IC data") 134 is data associated with IC component 124 that has been prepared for rendering by IC manager 104 and transmitted to mixer/renderer 110. Each application has an associated queue (not shown), which holds one or more work items (not shown) associated with rendering the application.

Presentation manager 106, which is configured for communication with both media content manager 104 and IC manager 102, facilitates handling of Presentation Content 120 and presentation of played presentation 127 to the user. Presentation manager 106 has access to a playlist 128. Playlist 128 includes, among other things, a time-ordered sequence of clips 123 and applications 155 (including interactive objects 125) that are presentable to a user. The clips 123 and applications 155/interactive objects 125 may be arranged to form one or more titles 131. For exemplary purposes, one title 131 is discussed herein. Playlist 128 may be implemented using an extensible markup language ("XML") document, or another data structure.

Presentation manager 106 uses playlist 128 to ascertain a presentation timeline 130 for title 131. Conceptually, presentation timeline 130 indicates the times within title 131 when specific clips 123 and applications 155 are presentable to a user. A sample presentation timeline 130, which illustrates exemplary relationships between presentation of clips 123 and applications 155 is shown and discussed in connection with FIG. 2. In certain circumstances, it is also useful to use playlist 128 and/or presentation timeline 130 to ascertain a media content timeline ("media timeline") 142 (an exemplary media timeline 142 is discussed further below, in connection with FIG. 6).

Presentation manager 106 provides information, including but not limited to information about presentation timeline 130, to media content manager 102 and IC manager 104. Based on input from presentation manger 206, media content manager 102 prepares media data 132 for rendering, and IC manager 104 prepares IC data 134 for rendering. In one implementation, presentation manager 106 controls media processing pipelines 159.

Figure 4:
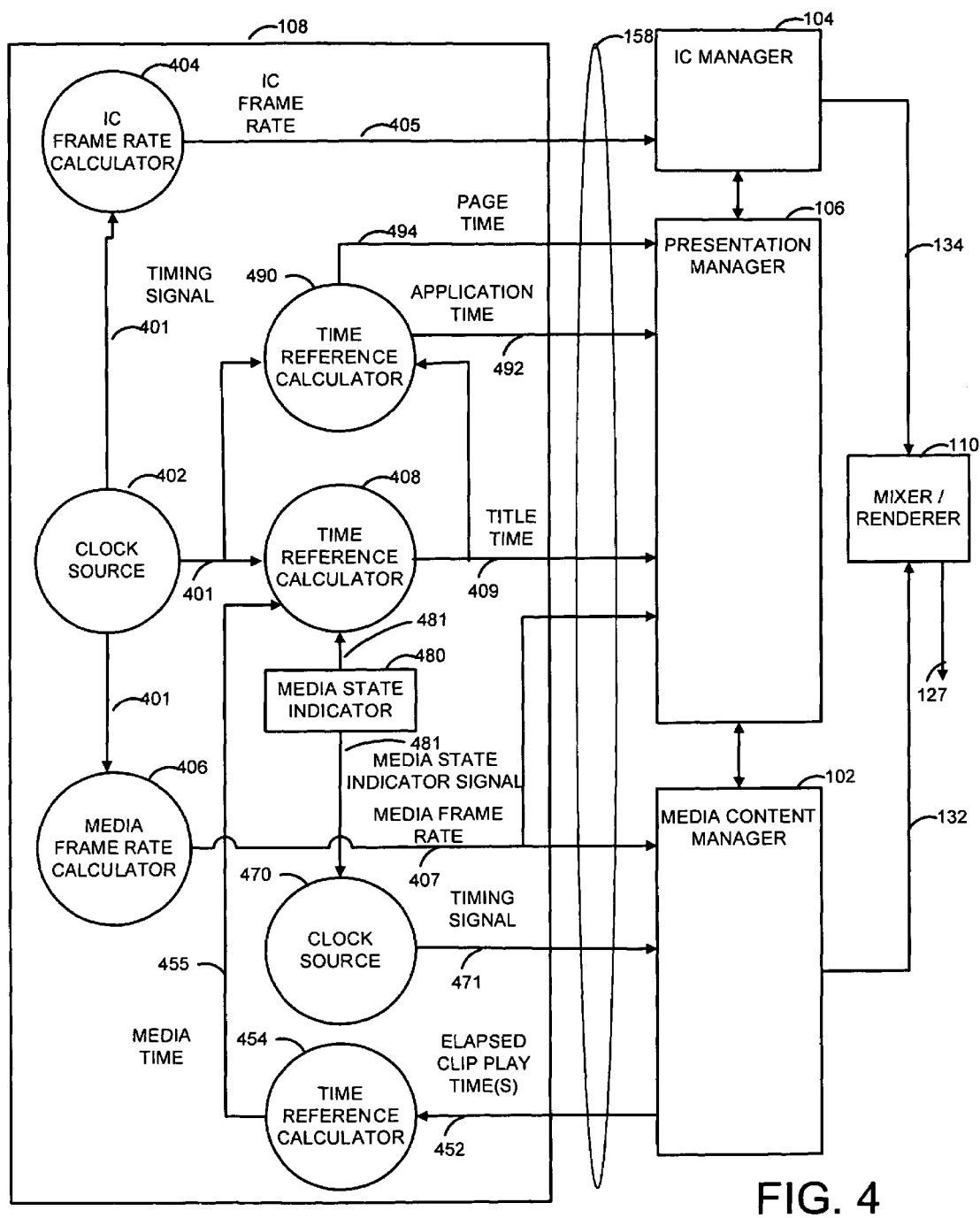
FIG. 4 is a simplified functional block diagram illustrating the timing signal management block of FIG. 1 in more detail.

Timing signal management block 108 produces various timing signals 158, which are used to control the timing for preparation and production of media data 132 and IC data 134 by media content manager 102 and IC manager 104, respectively. In particular, timing signals 158 are used to achieve frame-level synchronization of media data 132 and IC data 134. Details of timing signal management block 108 and timing signals 158 are discussed further below, in connection with FIG. 4.

Mixer/renderer renders media data 132 in a video plane (not shown), and renders IC data 134 in a graphics plane (not shown), The graphics plane is generally, but not necessarily, overlayed onto the video plane to produce played presentation 127 for the user.

Figure 2:
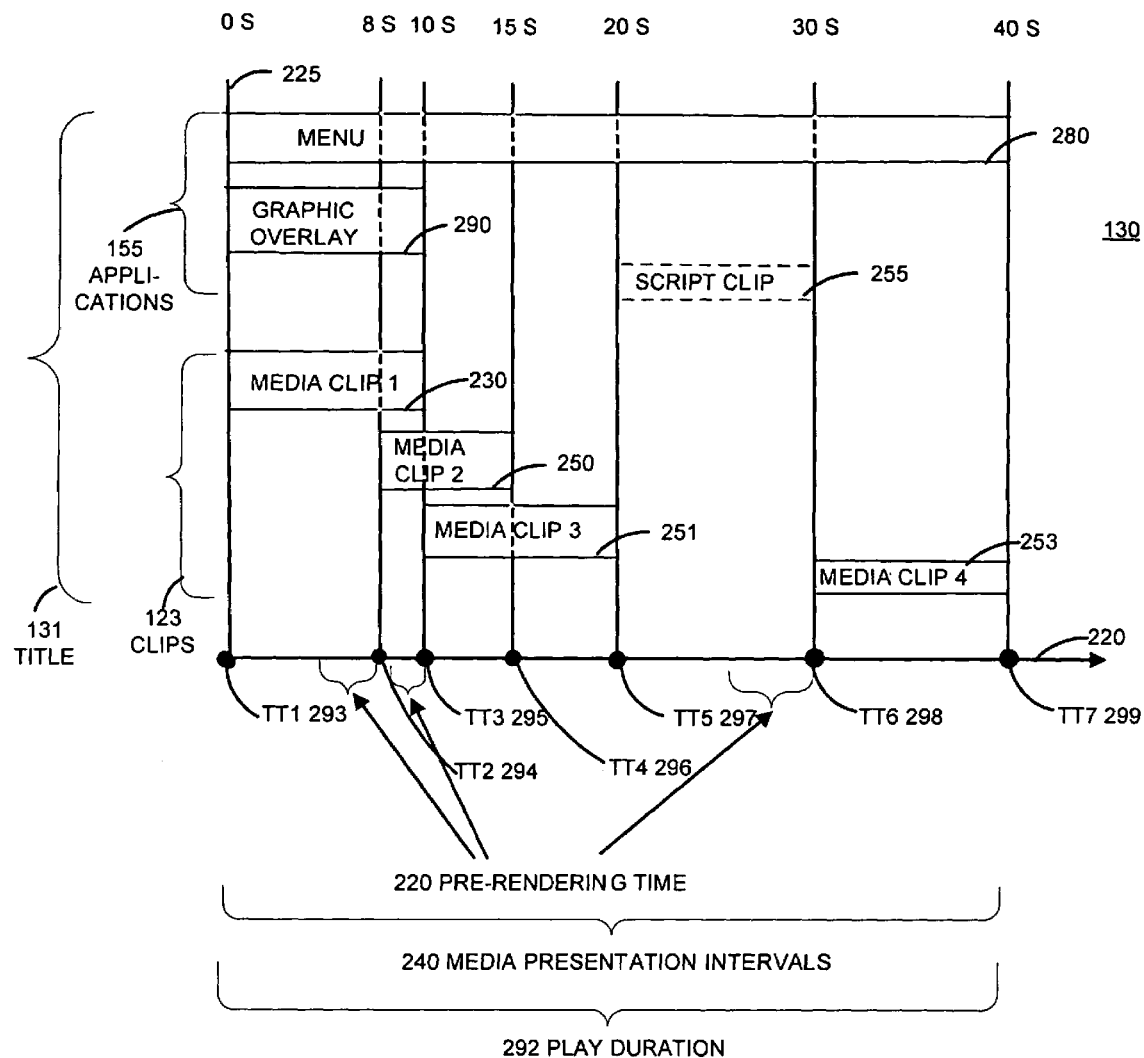
FIG. 2 is a graphical illustration of an exemplary presentation timeline, which is ascertainable from the playlist shown in FIG. 1.

With continuing reference to FIG. 1, FIG. 2 is a graphical illustration of a sample presentation timeline 130 for title 131 within playlist 128. Time is shown on horizontal axis 220. Information about media component 122 (clips 123 are illustrated) and IC component 124 (applications 155, which present interactive objects 125, are illustrated) is shown on vertical axis 225.

Regarding media component 122, four clips 123 are shown: a first media clip ("media clip 1") 230, a second media clip ("media clip 2") 250, a third media clip ("media clip 3") 251, and a fourth media clip ("media clip 4") 253. Media clip 1 230 is playable from zero seconds to 10 seconds via media processing pipeline 1 (shown in FIG. 1), media clip 2 250 is playable from eight seconds to 15 seconds via media processing pipeline 2 (also shown in FIG. 1), media clip 3 251 is playable from 10 seconds to 20 seconds via media processing pipeline 1, and media clip 4 253 is playable from 30 seconds to 40 seconds via media processing pipeline 2. No media content is scheduled by playlist 128 for play between 20 seconds and 30 seconds, although an application 155 may present script clip 255 for play via media processing pipeline 1 between 20 seconds and 30 seconds. Script clip is a media clip, such as an animated thumbnail, which is not generally included in the playlist, but which may be optionally invoked via an application at times (such as when no media content is scheduled for play) within played presentation 127.

Regarding IC component 124, as mentioned above in connection with FIG. 1, one application is responsible for presenting certain interactive objects that provide user-selectable items (for example, buttons with associated text or graphics) of menu 280. Another application is responsible for presenting one or more interactive objects that provide graphic overlay 290. As shown, menu 280 is displayed concurrently with media clips 1 through 4, and graphic overlay 290 is displayable concurrently with media clip 1 230 and a portion of media clip 2. A third application is responsible for presenting script clip 255 when there is no media content scheduled for presentation (as shown, script clip 255 is playable between 20 seconds and 30 seconds).

The particular amount of time along horizontal axis 220 in which title 131 is presentable to the user is referred to as play duration 292 of title 131. Specific times within play duration 292 are referred to as title times. Seven title times ("TTs") are shown on presentation timeline 130—TT1 293, TT2 294, TT3 295, TT4 296, TT5 297, TT6 298, and TT7 299. Because a title may be played once or may be played more than once (in a looping fashion, for example) play duration 292 is determined based on one iteration of title 131. Play duration 292 may be determined with respect to any desired reference, including but not limited to a predetermined play speed (for example, normal, or 1×, play speed), a predetermined frame rate, or a predetermined timing signal status. Play speeds, frame rates, and timing signals are discussed further below, in connection with FIG. 4.

It will be appreciated that implementation-specific factors such as display techniques, and specific rules regarding play sequences and timing relationships among clips and interactive objects for each title may impact upon exact values of a title's play duration and title times therein. The terms play duration and title times are intended to encompass all such implementation-specific details.

Although title times at/within which content associated with IC component 124 is presentable are generally predetermined, it will be appreciated that actions taken when the user interacts with such content may only be determined based on user input while Played Presentation 127 is playing. For example, the user may select, activate, or deactivate certain applications, interactive objects, and/or additional content associated therewith during play of Played Presentation 127.

Other times and/or durations within play duration 292 are also defined and discussed herein. Media presentation intervals 240 are defined by beginning and ending times of play duration 292 between which particular content associated with particular clips 123 is playable. For example, media clip 1 230 has a presentation interval 240 defined by beginning title time TT1 293 and ending TT3 295, media clip 2 250 has a presentation interval 240 defined by beginning title time TT2 294 and ending title time TT4 296, media clip 3 251 has a presentation interval 240 defined by beginning title time TT3 295 and ending title time TT5 297, media clip 4 253 has a presentation interval 240 defined by beginning title time TT6 298 and ending title time TT7 299, and script clip 255 has a presentation interval 240 defined by beginning title time TT5 297 and ending title time TT6 298.

Pre-rendering times 220 are title times (or intervals thereof) that precede the title times at which particular clips 123 are playable based on presentation timeline 130 by amounts based on variable time offset values (determination of time offset values and pre-rendering times 220 is discussed below, in connection with FIGS. 5 and 6).

Time intervals associated with applications 155 (such as application presentation intervals and application play durations) are defined and discussed below, in connection with FIG. 3.

Figure 3:
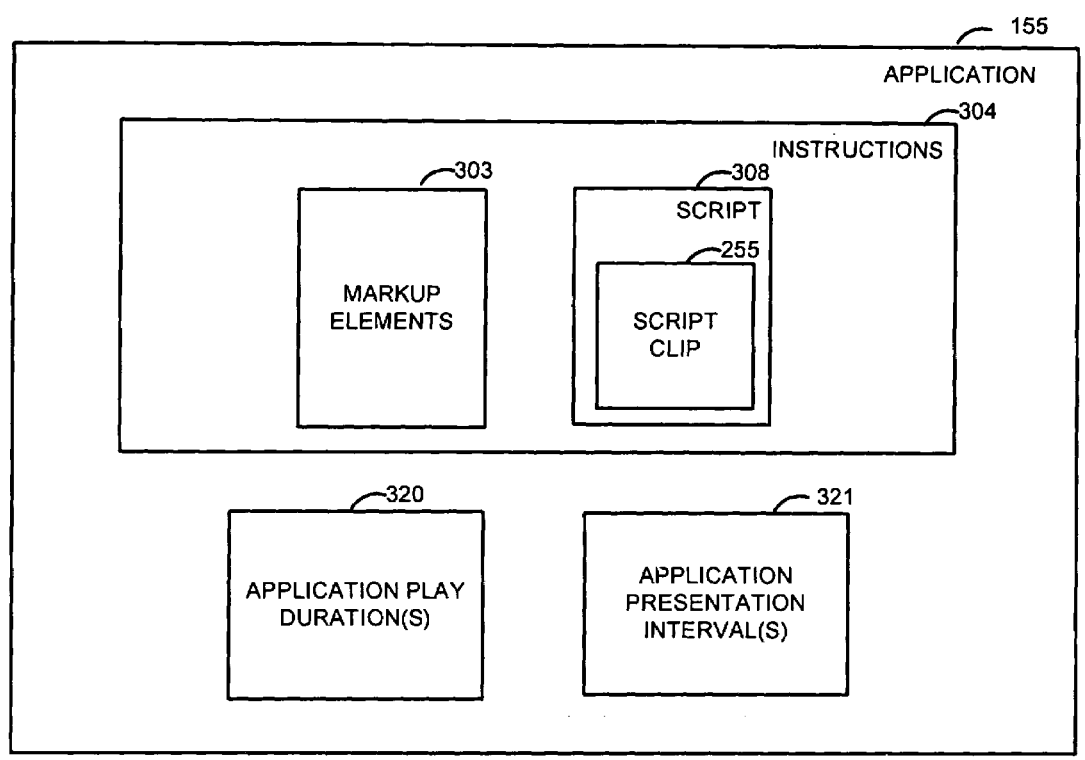
FIG. 3 is a simplified functional block diagram of an application associated with the interactive multimedia presentation shown in FIG. 1.

With continuing reference to FIGS. 1 and 2, FIG. 3 is a functional block diagram of a single application 155. Application 155 is generally representative of applications responsible for presenting interactive objects 280, 290, and 255 (shown in FIG. 2). Application 155 includes instructions 304 (discussed further below). Application 155 has associated therewith an application play duration 320 and one or more application presentation intervals 321.

Application play duration 320 is a particular amount of time, with reference to an amount (a part or all) of play duration 292 within which interactive objects 125 associated with application 155 are presentable to and/or selectable by a recipient of played presentation 127. In the context of FIG. 2, for example, application 155 responsible for menu 280 has an application play duration composed of the amount of time between TT1 293 and TT7 299. The application responsible for graphical overlay 290 has an application play duration composed of the amount of time between TT1 293 and TT3 295. The application responsible for script clip 255 has an application play duration composed of the amount of time between TT5 297 and TT6 298.

The intervals defined by beginning and ending title times obtained when an application play duration 320 associated with a particular application is conceptualized on presentation timeline are referred to as application presentation intervals 321. For example, referring to FIG. 2, the application responsible for menu 280 has an application presentation interval beginning at TT1 293 and ending at TT7 299, the application responsible for graphic overlay 290 has an application presentation interval beginning at TT1 293 and ending at TT3 295, and the application responsible for script clip 255 has an application presentation interval beginning at TT5 297 and ending at TT6 298.

In some cases, application 155 may have more than one page (pages are not shown). A page is a logical grouping of one or more interactive objects that are contemporaneously presentable within a particular application play duration 320 and/or application presentation interval 321. Interactive objects associated with a particular page may be presented concurrently, serially, or a combination thereof. The number of applications and pages associated with a given title, and the interactive objects associated with each application or page, are generally logical distinctions that are matters of design choice. For example, designation of a particular initial page is not necessary, more than one page of an application may be presented concurrently, or an application may be started with no pages (or an initial page that contains nothing). Pages of an application may be loaded and unloaded while keeping the application and script in tact. Multiple pages may be used when it is desirable to manage (for example, limit) the number or amount of resources associated with an application that are loaded into memory during execution of the application.

Instructions 304, when executed, perform tasks (among other tasks) related to rendering of interactive objects 125 associated with application 155, based on user input. One type of user input (or a result thereof) is a user event. User events are actions or occurrences initiated by a recipient of played presentation 127 that relate to IC component 124. User events are generally, but not necessarily, asynchronous. Examples of user events include, but are not limited to, user interaction with interactive objects within played presentation 127, such as selection of a button within menu 280, selection of the circle associated with graphical overlay 290, or invocation of script clip 255. Such interactions may occur using any type of user input device now known or later developed, including a keyboard, a remote control, a mouse, a stylus, or a voice command. It will be appreciated that application 155 may respond to events other than user events, such as system events, document object model events, or other types of events.

In one implementation, instructions 304 are computer-executable instructions encoded in computer-readable media (discussed further below, in connection with FIGS. 8 and 9). In the examples set forth herein, instructions 304 are implemented using either script 308 or markup elements 303. Although either script or markup elements may be used alone, in general, the combination of script and markup elements enables the creation of a comprehensive set of interactive capabilities for a high-definition DVD movie.

Script 308 includes instructions 304 written in a non-declarative programming language, such as an imperative programming language. An imperative programming language describes computation in terms of a sequence of commands to be performed by a processor. In most cases where script 308 is used, the script is used to respond to user events. Script 308 is useful in other contexts, however, such as handling issues that are not readily or efficiently implemented using markup elements alone. Examples of such contexts include handling aspects of the presentation of script clip 255, system events, state management, and resource management (for example, accessing cached or persistently stored resources). In one implementation, script 308 is ECMAScript as defined by ECMA International in the ECMA-262 specification. Common scripting programming languages falling under ECMA-262 include JavaScript and JScript. In some settings, it may be desirable to implement 308 using a subset of ECMAScript 262, such as ECMA-327.

Markup elements 303 represent instructions 304 written in a declarative programming language, such as Extensible Markup Language ("XML"). In XML, elements are logical units of information defined, using start-tags and end-tags, within XML documents. XML documents are data objects that are made up of storage units called entities (also called containers), which contain either parsed or unparsed data.

Parsed data is made up of characters, some of which form character data, and some of which form markup. Markup encodes a description of the document's storage layout and logical structure. There is one root element in an XML document, no part of which appears in the content of any other element. For all other elements, the start-tags and end-tags are within the content of other elements, nested within each other.

An XML schema is a definition of the syntax(es) of a class of XML documents. Some XML schemas are defined by the World Wide Web Consortium ("W3C"). Other XML schemas have been promulgated by the DVD Forum for use with XML documents in compliance with the DVD Specifications for High Definition Video, and for other uses. It will be appreciated that other schemas for high-definition DVD movies, as well as schemas for other interactive multimedia presentations, are possible.

At a high level, an XML schema includes: (1) a global element declaration, which associates an element name with an element type, and (2) a type definition, which defines attributes, sub-elements, and character data for elements of that type. Attributes of an element specify particular properties of the element using a name/value pair, with one attribute specifying a single element property.

With continuing reference to FIGS. 1-3, FIG. 4 is a simplified functional block diagram illustrating various components of timing signal management block 108 and timing signals 158 in more detail.

Timing signal management block 108 is responsible for the handling of clocks and/or timing signals that are used to determine specific times or time durations within Presentation System 100. As shown, a continuous timing signal 401 is produced at a predetermined rate by a clock source 402. Clock source 402 may be a clock associated with a processing system, such as a general-purpose computer or a special-purpose electronic device. Timing signal 401 produced by clock source 402 generally changes continually as a real-world clock would—within one second of real time, clock source 402 produces, at a predetermined rate, one second worth of timing signals 401.

Timing signal 401 is input to IC frame rate calculator 404, media frame rate calculator 406, time reference calculator 408, and time reference calculator 490. IC frame rate calculator 404 produces a timing signal 405 based on timing signal 401. Timing signal 405 is referred to as an "IC frame rate," which represents the rate at which frames of IC data 134 are produced by IC manager 104. One exemplary value of the IC frame rate is 30 frames per second. The frequency of IC frame rate 405 (referred to as the "presentation clock frequency") may dynamically change, however. It will also be appreciated that the processing load within various components of Presentation System 100 may change based on the presentation clock frequency. IC frame rate calculator 404 may reduce or increase the rate of timing signal 401 to produce timing signal 405.

Frames of IC data 134 generally include, for each valid application 155 and/or page thereof, a rendering of each interactive object 125 associated with the valid application and/or page in accordance with relevant user events. For exemplary purposes, a valid application is one that has an application presentation interval 321 within which the current title time of play duration 292 falls, based on presentation timeline 130. It will be appreciated that an application may have more than one application presentation interval. It will also be appreciated that no specific distinctions are made herein about an application's state based on user input or resource availability.

Media frame rate calculator 406 also produces a timing signal—timing signal 407—based on timing signal 401. Timing signal 407 is referred to as a "media frame rate," which represents the rate at which frames of media data 132 are produced by media content manager 102. The media frame rate may be the same as, or different from, IC frame rate 405. One exemplary value of the media frame rate is 24 frames per second. The frequency of media frame rate 407 may dynamically change, however, media frame rate calculator 406 may reduce or increase the rate of timing signal 401 to produce timing signal 407.

A clock source 470 produces timing signal 471, which governs the rate at which information associated with clips 123 is produced from media sources 161. Clock source 470 may be the same clock as clock 402, or based on the same clock as clock source 402. Alternatively, clocks 470 and 402 may be altogether different, and/or have different sources. Likewise, media frame rate 407 may be the same as, or based on the same value as, timing signal 471, or the timing signals may be different.

Clock source 470 adjusts the rate of timing signal 471 (which is referred to as the "media clock frequency") based on a media state indicator signal 481, which is produced by media state indicator block 480. Media state indicator signal 481 represents a particular retrieval state of video, audio, or data information from a particular media source 160 (shown in FIG. 1). Such retrieval states may be directly or indirectly based on user input, or on the content of playlist 128 (also shown in FIG. 1). The media clock frequency may also vary based on media source characteristics 162 such as encoding or decoding rates. Thus, the media clock frequency may change from clip to clip.

Certain user input changes the play speed of played presentation 127, and thus the speed of retrieval of video, audio, or data information from a particular media source 160. For example, played presentation 127 may proceed in a forward direction at a normal speed, and may also proceed in both forward and reverse directions at speeds faster or slower than the normal speed. It will appreciated that normal speed is a relative term, and that normal speed may vary from presentation to presentation, and from clip to clip.

Retrieval states of video, audio, or data information from a particular media source may be defined based on various play speeds of played presentation 127. For example, a normal play retrieval state is defined to occur when played presentation 127 proceeds in a forward direction at normal speed. A slow-forward retrieval state is defined to occur when played presentation 127 proceeds in a forward direction but slower than in real time. A fast-forward retrieval state is defined to occur when played presentation 127 proceeds in a forward direction but faster than in real time. A slow-reverse retrieval state is defined to occur when played presentation 127 proceeds in a reverse direction but slower than in real time. A fast-reverse retrieval state is defined to occur when played presentation 127 proceeds in a reverse direction but faster than in real time.

During fast-reverse and fast-forward retrieval states, the playing of certain media content is often skipped. Other user input may cause the playing of certain content to be skipped, such as when the user jumps from one part of the movie to another (by making selections from interactive menus such as menu 280, for example). The user may also start and stop the movie at various places and at various times.

Retrieval states associated with locating and/or beginning to play video, audio, or data information associated with a particular clip 123 from a particular media source 160 may also be defined. For example, a closed state is defined to occur before video, audio, or data information associated with a particular clip 123 has been read from a particular media source 160. A ready state is defined to occur when a first group of samples of video, audio, or data information from a particular media source 160 has been decoded and is ready to be rendered. A pre-rolling state is defined to occur between the closed state and the ready state, when steps are being taken to prepare the first group of samples of video, audio, or data information from a particular media source 160 for rendering. Such steps include, but are not limited to, reading information from a particular media source 160, and demulitplexing, decoding and/or decrypting the information. It will be understood that the first group of samples of information from a particular media source is not necessarily the first group of samples occurring within a particular clip 123, and that how a first group of samples is defined may vary from presentation to presentation, based on factors such as encoding or encryption formats or protocols.

Elapsed clip play times 452 represent the amounts of time that have elapsed within particular presentation intervals 240 associated with active clips 123. For purposes of discussion herein, an active clip is one that has a presentation interval 240 (shown in FIG. 2) within which the current title time of play duration 292 falls, based on presentation timeline 130. Time reference calculator 454 receives time references 452 and produces a media time reference 455. Media time reference 455 represents the total amount of play duration 292 that has elapsed based on one or more time references 452. In general, when two or more clips are playing concurrently, only one time reference 452 is used to produce media time reference 455. The particular clip used to determine media time reference 455, and how media time reference 455 is determined based on multiple clips, is a matter of implementation preference.

Time reference calculator 408 receives timing signal 401, media time reference 455, and media state indicator signal 481, and produces a title time reference 409. Title time reference 409 represents the total amount of time that has elapsed within play duration 292 based on one or more of the inputs to time reference calculator 408.

Time reference calculator 490 receives timing signal 401 and title time reference 409, and produces application time reference(s) 492 and page time reference(s) 494. A single application time reference 492 represents an amount of elapsed time of a particular application play duration 320 (shown and discussed in connection with FIG. 3), with reference to continuous timing signal 401. Application time reference 492 is determined when title time reference 409 indicates that the current title time falls within application presentation interval 321 of the particular application. Application time reference 492 re-sets (for example, becomes inactive or starts over) at the completion of application presentation interval 321. Application time reference 492 may also re-set in other circumstances, such as in response to user events, or when trick play occurs.

Page time reference 494 represents an amount of elapsed time within a play duration for a particular page of an application, with reference to continuous timing signal 401. Page time reference 494 for a particular page of an application is determined when title time reference 409 indicates that the current title time falls within an applicable page presentation interval (not shown). Page presentation intervals are sub-intervals of application presentation intervals 321 (shown in FIG. 3). Page time reference(s) 494 may re-set at the completion of the applicable page presentation interval(s) (not shown). Page time reference 494 may also re-set in other circumstances, such as in response to user events, or when trick play occurs. It will be appreciated that interactive object presentation intervals, which may be sub-intervals of application presentation intervals 321 and/or page presentation intervals, are also definable.

Table 1 illustrates exemplary occurrences during play of played presentation 127 by Presentation System 100, and the effects of such occurrences on application time reference 492, page time reference 494, title time reference 409, and media time reference 455.

TABLE 1

| Occurrence | Application Time 492 | Page Time 494 | Title Time 409 | Media Time 455 |
|---|---|---|---|---|
| Movie starts | Inactive unless/until application is valid | Inactive unless/until applicable page is valid | Starts (e.g., at zero) | Starts (e.g., at zero) |
| Next clip starts | Inactive unless/until application is valid | Inactive unless/until applicable page is valid | Determined based on previous title time and elapsed clip play time | Re-sets/re-starts |
| Next title starts | Inactive unless/until application is valid | Inactive unless/until applicable page is valid | Re-sets/re-starts | Re-sets/re-starts |
| Application becomes valid | Starts | Starts when applicable page is valid | Continues/no effect | Continues/no effect |
| Trick Play | Re-sets/re-starts if applicable application is valid at the title time jumped to; otherwise becomes inactive | Re-sets/re-starts if applicable page is valid at the title time jumped to; otherwise becomes inactive | Based on jumped-to location, advances or retreats to time corresponding to elapsed play duration on presentation timeline | Advances or retreats to time corresponding to elapsed clip play time(s) of active clip(s) at the jumped-to location within the title |
| Change play speed times N | Continues/no effect | Continues/no effect | Elapses N times faster | Elapses N times faster |
| Movie pauses | Continues/no effect | Continues/no effect | Pauses | Pauses |
| Movie resumes | Continues/no effect | Continues/no effect | Resumes | Resumes |

Having access to various timelines, clock sources, timing signals, and timing signal references enhances the ability of Presentation System 100 to achieve frame-level synchronization of IC data 124 and media data 132 within played presentation 127, and to prioritize the glitch-free presentation of the clips that comprise media component 122.

With continuing reference to FIGS. 1-4, FIG. 5 is a flowchart of one method for enhancing the ability of a presentation system, such as Presentation System 100, to present the media content of a particular presentation, such as clips 123 shown on presentation timeline 130 of FIG. 2, in a glitch-free manner.

The method begins at block 500, and continues at block 502, where, at a first time, playing of a first set of media samples from a first media source commences. Next, at block 504, a second set of media samples, playable at a second time from a second media source, is identified. A static characteristic of the second media source is ascertained, at block 506. A dynamic characteristic of the presentation system is also ascertained, at block 508. Next, at block 510, a time offset value is determined based on the static and dynamic characteristics. Finally, at block 512, the second set of media samples is pre-rendered at a time that is based on the time offset value.

Figure 5:
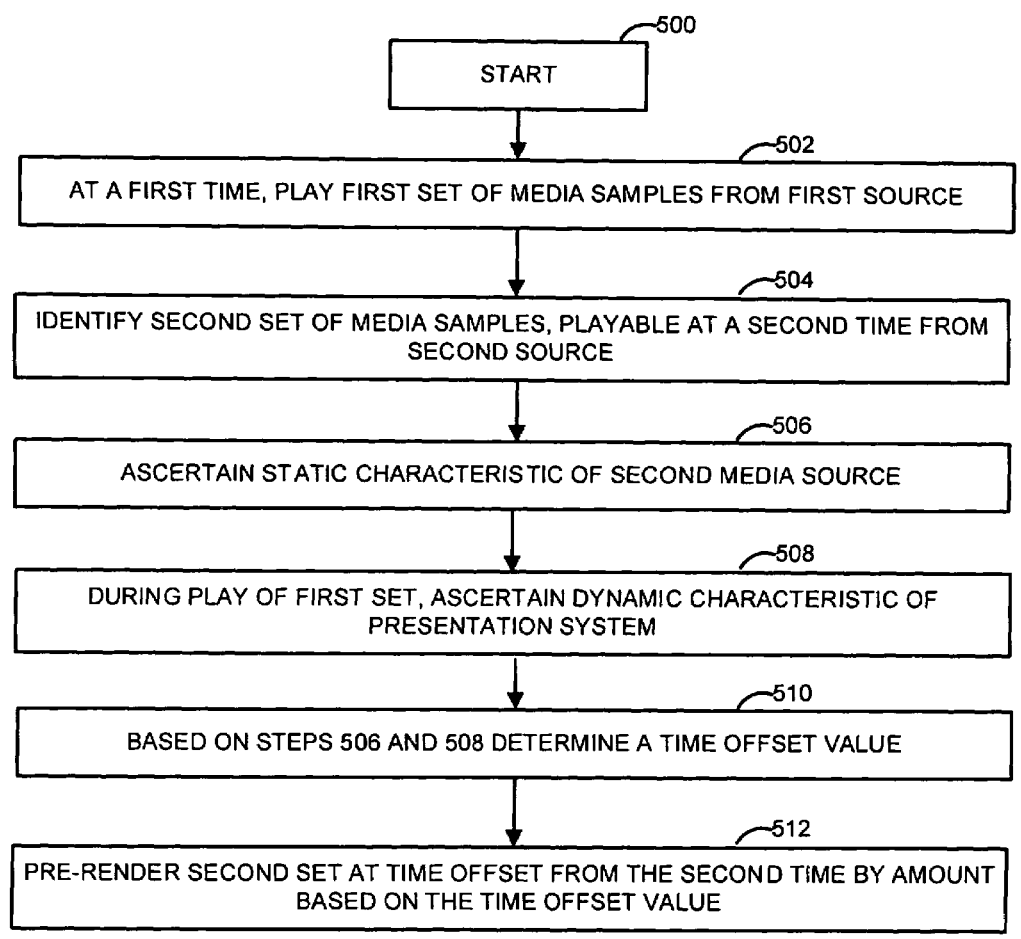
FIG. 5 is a flowchart of a method for playing media content, such as the media content shown in FIG. 2, using a presentation system, such as the interactive multimedia presentation system shown in FIG. 1.

For exemplary purposes, the method of the flowchart of FIG. 5 is discussed in the context of Presentation System 100, particularly with reference to media component 122 and applications 155 presentable to a user in accordance with presentation timeline 130 (shown in FIG. 2).

Referring to FIG. 2, it is desirable to ensure the glitch-free play of media clip 1 230, media clip 2 250, media clip 3 251, media clip 4 253, and to maximize the play time of script clip 255, in an environment where processing and decoding resources are limited. In one implementation, Presentation System 100 has one central processing unit, one graphics processing unit, and one decoder, although other arrangements are possible. It is therefore desirable that the ready retrieval state (represented by media state indicator signal 481, shown and discussed in connection with FIG. 4) for at least a portion of each clip be reached at or before the title time at which the clip is scheduled for presentation on presentation timeline 130. In this regard, it is important to leave adequate time for completing the pre-rolling retrieval state (also discussed in connection with FIG. 4), but it is also important to minimize undue negative effects on other important activities occurring within the presentation system, such as the playing of script clip 255 or other clips. Pre-rendering activities occurring within the pre-rolling retrieval state for a particular clip may result in another clip being stopped. One way in which undue negative effects can be minimized is by completing the pre-rolling retrieval state close to or at the title time at which the clip is scheduled for presentation.

In one instance, it is desirable to reach the ready state for at least a portion of media clip 3 251 at or before TT3 295, which is the time at which a transition occurs between the playing media clip 1 230 via media pipeline 1 and the playing of media clip 3 251 via media pipeline 2. Because the transition at TT3 295 occurs while media clip 2 250 is playing via media pipeline 1 (and thus there is an existing media processing load), waiting until at or too close to TT3 295 to enter the pre-rolling retrieval state for a portion of media clip 3 251 could result in the user experiencing a glitch at TT3. For example, if video is scheduled for play at TT3, the video may pause for a few seconds, or some video may be dropped; if audio is scheduled for play at TT3, there may be silence for a few seconds, or some audio may be dropped. Glitches may occur with respect to play of media clip 2 250, media clip 3 251, or both media clip 2 250 and media clip 3 251.

In another instance, it is desirable to reach the ready state for at least a portion of media clip 4 253, which is played via media pipeline 2, at or before TT6 298. Because the transition at TT6 298 occurs while script clip 255 is playing via media pipeline 1, waiting until at or too close to TT6 298 to enter the pre-rolling retrieval state for a portion of media clip 4 253 could result in the user experiencing a glitch at TT6. Entering the pre-rolling retrieval state for a portion of media clip 4 253 too soon, however, could have the undesirable effect of reducing the play time of script clip 255.

Accordingly, it is desirable to determine pre-rendering times 220 for at least portions of media clip 3 251 and media clip 4 253. When play of Presentation Content 120/played presentation 127 is occurring in a forward direction, the pre-rendering time for media clip 3 251 occurs prior to TT3 295, and the pre-rendering time 220 for media clip 4 253 occurs prior to TT6 298. It will be appreciated that pre-rendering times may also be provided for play that occurs in a reverse direction.

Pre-rendering times 220 are generally determined based on a time offset value, which is calculated one or more times during play of the preceding clip or clips. In one implementation, one or more steps associated with determining the time offset value may be performed when play of the preceding clip(s) commences, and one or more steps may be repeated at other times during play of the preceding clip(s), as the time for rendering the next clip approaches (but before the pre-rendering time is reached).

One aspect of the time offset value is determined by ascertaining one or more media source characteristics 162 (shown in FIG. 1) of the media source 160 from which the subsequently playable clip is receivable. Media source characteristics 162 such as the location of the media source, codec parameters or settings (such as encoding or decoding formats or protocols, GOP size settings, compression settings, or quality settings), or encryption parameters or settings (such as encryption types, formats, or protocols) affect the processing or decoding resources (and thus the time) needed to complete the pre-rolling retrieval state for a particular clip or portion thereof. The size of the portion of the clip to be decoded is also a static characteristic that may affect the time needed to complete the pre-rolling retrieval state.

In the instances of determining pre-rendering times for portions of media clip 3 251 and media clip 4 253, one or more media source characteristics 162 of media source 1 and media source 2, respectively, are ascertained. In one implementation, one or more media source characteristics 162 of media source 1 are stored in a data structure such as a table. One or more media source characteristics 162 of media source 2 are also stored in a data structure such as a table. The data structures storing media source characteristics of media source 1 and media source 2 may be the same data structures or different data structures. The data structure(s) are accessed or stored by media content manager 102 and communicated to presentation manager 106. Media content manager 102 may communicate the data structures themselves, or time offset values having initial, or default, values based on the data structures. Alternatively, presentation manager 106 (or another component of Presentation System 100) accesses the media source characteristic(s) and/or the data structure(s) directly, and determines initial time offset values.

A second aspect of the time offset value is determined by ascertaining one or more dynamic characteristics of Presentation System 100. Dynamic characteristics represent conditions affecting processing or decoding operations that may change during operation of Presentation System 100. Examples of dynamic characteristics include, but are not limited to, the media clock frequency, the presentation clock frequency, the media processing load, the general processing load, and the value(s) of media state indicator signal 481.

In the instances of determining pre-rendering times for portions of media clip 3 251 and media clip 4 253, one or more dynamic characteristics of Presentation System 100 could affect (for example, increase) the initial time offset value(s) established with reference to the static characteristic(s) of a particular media source. In general, when the processing or decoding load within Presentation System 100 is high, more time is required to complete the pre-rolling retrieval state, and the time offset value is increased.

The processing and/or decoding load is increased in various situations, such as when the media processing load is increased (for example, multiple clips are playing concurrently and/or the media clock frequency is high), when the graphics processing load is increased (for example, the presentation clock frequency is high), when the general processing load is increased (for example, other programs, such as anti-virus programs, are running concurrently), and when media state indicator signal 481 indicates a retrieval state that is other than the normal play retrieval state (for example, played presentation is proceeding in the forward or reverse direction at speeds faster or slower than the normal speed).

Receiving user input that affects the play speed of media component 122 (such as trick play, pausing, slow-forwarding, fast-forwarding, slow-reversing, or fast-reversing) can exacerbate the problem of presenting media component 122 in a glitch-free manner, because more processing and decoding resources are used to predict and prepare certain portions of active clips from media source(s) 160 during times when the play speed of media component 122 is affected than when media component 122 proceeds at normal speed.

Figure 6:
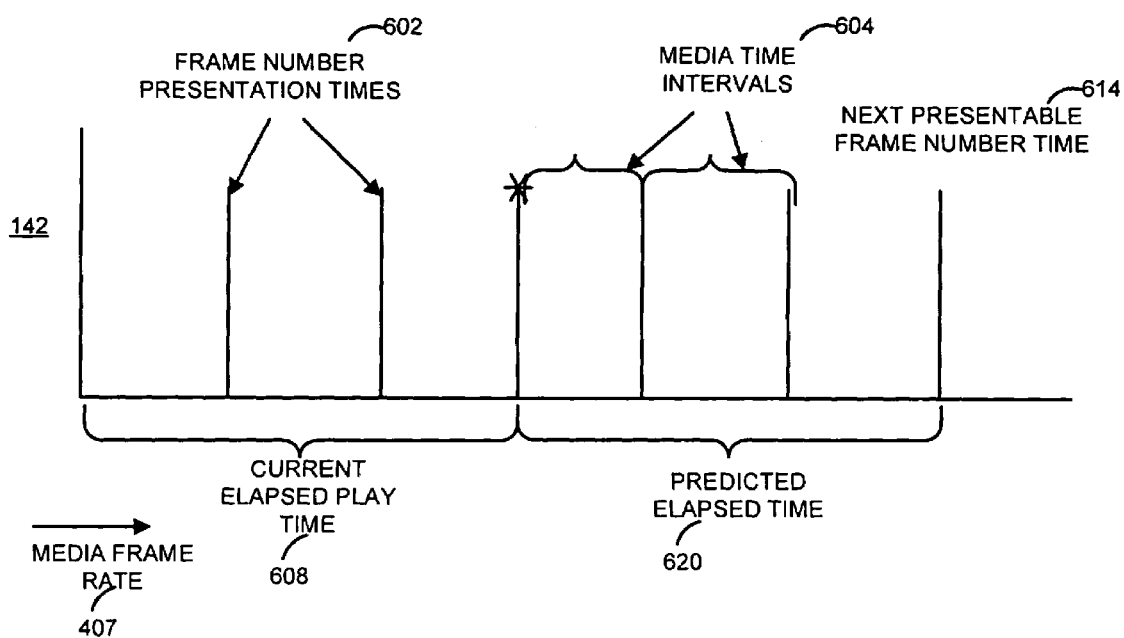
FIG. 6 is a schematic of an exemplary media timeline usable in connection with certain aspects of the method shown in the flowchart of FIG. 5.

FIG. 6 is a schematic of an exemplary media timeline 142 (with reference to media frame rate 407), which illustrates certain processing steps associated with playing media content 122 at speeds other than normal speed in the forward direction. Various frame number presentation times 602 are indicated on media timeline 142. Frame number presentation times 602 represent times within play duration 292 (shown in FIG. 2) at which individual numbered sets of media data 132 are presentable. As shown, frame number presentation times 602 occur at a rate based on media frame rate 407, which also defines the duration of periodic media time intervals 604 between frame number presentation times 602. Note that it is not necessary for media frame rate 407 to be the same as the frame rate at which a particular clip 123 was encoded, although the media clock frequency may change based on the encoding frame rate for a particular clip. IC frame rate 405 (not shown) is assumed to be 30 frames per second (although the presentation clock frequency may also change dynamically).

A current elapsed play time 608 of play duration 292 is shown on media timeline 142. Current elapsed play time 608 may be the current value of title time 409, for example. A next presentable frame number presentation time 614 is also shown. Next presentable frame number presentation time 614 represents the frame number presentation time 602 associated with the next frame number (after the frame number associated with current elapsed play time 709/title time 409) that is presentable to a user. It will be appreciated that the next presentable frame number may be the next consecutive frame number based on playlist 128, or may be a frame number one or more frame number presentation times 602 away from the frame number associated with current elapsed play time 608. During normal play speed, subsequent IC presentation time 712 is selected by adding an amount based on IC frame rate 407 to current IC presentation time 710.

When media state indicator signal 481 indicates that a play state is other than normal play speed (for example, fast-forward or fast-reverse), however, one way to ascertain next presentable frame number time 614 is to predict an amount of elapsed time 620 of play duration 292 (in addition to current elapsed play time 608/title time 409) that has passed based on the play speed and media frame rate 407.

In one implementation, the predicted amount of elapsed time 620 is calculated by estimating how many predicted frame number presentation times 602 on media timeline 142 have passed since presentation of media content at current elapsed play time 608/title time 409. For example, the predicted amount of elapsed time 620 may be calculated by adding a multiplier value to current elapsed play time 608. The multiplier value is obtained by multiplying a play speed factor (which may be a positive or a negative number, depending on the direction of the play speed change), by a frame rate factor. The play speed factor is obtained by dividing a value representing the play speed by media frame rate 407. The frame rate factor is obtained by dividing media frame rate 407 by IC frame rate 405.

Then, the predicted amount of elapsed time 620 is used to locate the particular frame number presentation time 602 that will be the next presentable frame number presentation time 614. Often, at various play speeds, patterns can be observed between the predicted amount of elapsed time 620 (and frame number presentation times 602 corresponding thereto) and corresponding next presentable frame number presentation times 614. Recognizing such patterns may reduce the need to perform calculations at each frame number presentation time 602. The patterns can be represented in predetermined tables or other data structures, which can be used to look up next frame number presentation times 614 based on particular frame number presentation times 602. Using predetermined data structures or tables in this manner, rendering of certain frames and other adjustments may be skipped. In addition, multiple media timelines may be processed concurrently (in an instance where more than one clip is playing, for example).

Referring again to the flowchart of FIG. 5, it can be seen that accurately accounting for one or more dynamic characteristics of Presentation System 100 assists in determination of time offset values (and thus pre-rendering times 220) that allow the pre-rolling and ready retrieval states for upcoming media clips to be completed at or around the times the media clips are scheduled for play. In the instances of determining pre-rendering times for portions of media clip 3 251 and media clip 4 253, the time offset value could be increased in the presence of one or more dynamic characteristics, such as the presentation clock frequency, the media clock frequency, or the current retrieval state indicated by media state indicator signal 481, to provide more time for completing pre-rolling retrieval states.

In one implementation, the time offset value used for determining pre-rendering time 220 for a particular clip is arrived at via negotiation between presentation manager 106 and media content manager 102. Presentation manager 106 starts with the initial, or default, time offset value determined with reference to one or more static characteristics of the media source of the upcoming clip (which in one implementation is received or ascertainable from media content manager 102 via one or more data structures such as tables). Then, presentation manager 106 adjusts the initial time offset value (one or more times during play of the current clip(s)) based on one or more dynamic characteristics. The adjusted time offset value is communicated to media content manager 102, which further adjusts the time offset value based on the current media processing load, and communicates the further adjusted time offset value to presentation manager 106. Then, presentation manager 106 instructs media content manager 102 to place the upcoming clip into the pre-rolling retrieval state at a particular pre-rendering time 220 based on the further adjusted time offset value. Other implementations are also possible. In one alternative implementation, if media content manger 102 has knowledge of the upcoming clip(s), media content manager 102 could determine the pre-rendering time directly. In another alternative implementation, a single component of Presentation System 100 could determine the time offset values and/or the pre-rendering times.

The process(es) illustrated in FIG. 5 may be implemented in one or more general, multi-purpose, or single-purpose processors, such as processor 702 discussed below in connection with FIG. 7. Unless specifically stated, the methods described herein are not constrained to a particular order or sequence. In addition, some of the described method or elements thereof can occur or be performed concurrently.

Figure 7:
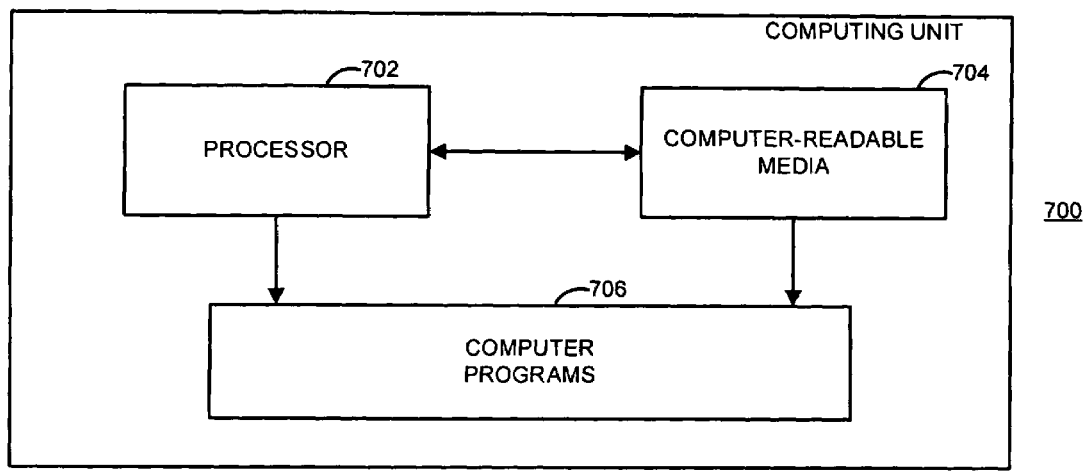
FIG. 7 is a simplified functional block diagram of a general-purpose computing unit usable in connection with aspects of the interactive multimedia presentation system shown in FIG. 1.

FIG. 7 is a block diagram of a general-purpose computing unit 700, illustrating certain functional components that may be used to implement, may be accessed by, or may be included in, various functional components of Presentation System 100. One or more components of computing unit 700 may be used to implement, be accessible by, or be included in, IC manager 104, presentation manager 106, and media content manager 102. For example, one or more components of FIG. 7 may be packaged together or separately to implement functions of Presentation System 100 (in whole or in part) in a variety of ways.

A processor 702 is responsive to computer-readable media 704 and to computer programs 706. Processor 702, which may be a real or a virtual processor, controls functions of an electronic device by executing computer-executable instructions. Processor 702 may execute instructions at the assembly, compiled, or machine-level to perform a particular process. Such instructions may be created using source code or any other known computer program design tool.

Computer-readable media 704 represent any number and combination of local or remote devices, in any form, now known or later developed, capable of recording, storing, or transmitting computer-readable data, such as the instructions executable by processor 702. In particular, computer-readable media 704 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 704 may also include transmission media and data associated therewith. Examples of transmission media/data include, but are not limited to, data embodied in any form of wireline or wireless transmission, such as packetized or non-packetized data carried by a modulated carrier signal.

Computer programs 706 represent any signal processing methods or stored instructions that electronically control predetermined operations on data. In general, computer programs 706 are computer-executable instructions implemented as software components according to well-known practices for component-based software development, and encoded in computer-readable media (such as computer-readable media 704). Computer programs may be combined or distributed in various ways.

Functions/components described in the context of Presentation System 100 are not limited to implementation by any specific embodiments of computer programs. Rather, functions are processes that convey or transform data, and may generally be implemented by, or executed in, hardware, software, firmware, or any combination thereof, located at, or accessed by, any combination of functional elements of Presentation System 100.

Figure 8:
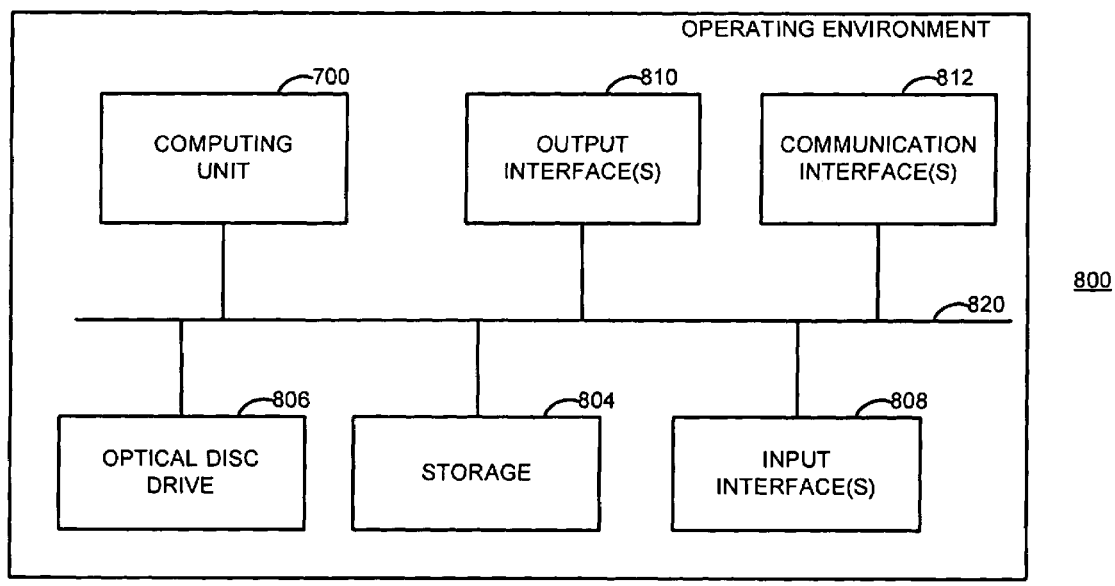
FIG. 8 is a simplified function block diagram of an exemplary configuration of an operating environment in which the interactive multimedia presentation system shown in FIG. 1 may be implemented or used.

With continued reference to FIG. 7, FIG. 8 is a block diagram of an exemplary configuration of an operating environment 800 in which all or part of Presentation System 100 may be implemented or used. Operating environment 800 is generally indicative of a wide variety of general-purpose or special-purpose computing environments. Operating environment 800 is only one example of a suitable operating environment and is not intended to suggest any limitation as to the scope of use or functionality of the system(s) and methods described herein. For example, operating environment 800 may be a type of computer, such as a personal computer, a workstation, a server, a portable device, a laptop, a tablet, or any other type of electronic device, such as an optical media player or another type of media player, now known or later developed, or any aspect thereof. Operating environment 800 may also be a distributed computing network or a Web service, for example. A specific example of operating environment 800 is an environment, such as a DVD player or an operating system associated therewith, which facilitates playing high-definition DVD movies.

As shown, operating environment 800 includes or accesses components of computing unit 700, including processor 702, computer-readable media 704, and computer programs 706. Storage 804 includes additional or different computer-readable media associated specifically with operating environment 800, such as an optical disc, which is handled by optical disc drive 806. One or more internal buses 920, which are well-known and widely available elements, may be used to carry data, addresses, control signals and other information within, to, or from computing environment 800 or elements thereof.

Input interface(s) 808 provide input to computing environment 800. Input may be collected using any type of now known or later-developed interface, such as a user interface. User interfaces may be touch-input devices such as remote controls, displays, mice, pens, styluses, trackballs, keyboards, microphones, scanning devices, and all types of devices that are used input data.

Output interface(s) 810 provide output from operating environment 800. Examples of output interface(s) 810 include displays, printers, speakers, drives (such as optical disc drive 806 and other disc drives), and the like.

External communication interface(s) 812 are available to enhance the ability of operating environment 800 to receive information from, or to transmit information to, another entity via a communication medium such as a channel signal, a data signal, or a computer-readable medium. External communication interface(s) 812 may be, or may include, elements such as cable modems, data terminal equipment, media players, data storage devices, personal digital assistants, or any other device or component/combination thereof, along with associated network support devices and/or software or interfaces.

Figure 9:
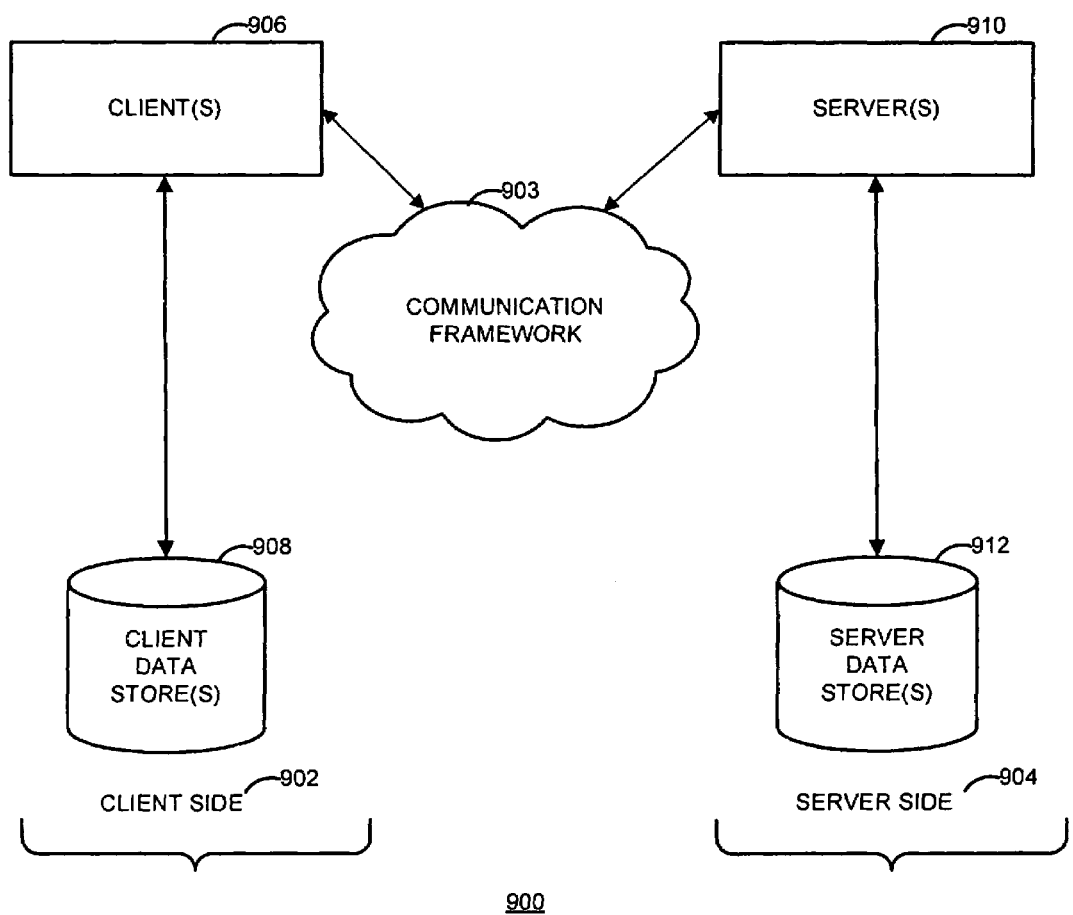
FIG. 9 is a simplified functional diagram of a client-server architecture in which the interactive multimedia presentation system shown in FIG. 1 may be implemented or used.

FIG. 9 is a simplified functional diagram of a client-server architecture 900 in connection with which the Presentation System 100 or operating environment 900 may be used. One or more aspects of Presentation System 100 and/or operating environment 800 may be represented on a client-side 902 of architecture 900 or on a server-side 904 of architecture 900. As shown, communication framework 903 (which may be any public or private network of any type, for example, wired or wireless) facilitates communication between client-side 902 and server-side 904.

On client-side 902, one or more clients 906, which may be implemented in hardware, software, firmware, or any combination thereof, are responsive to client data stores 908. Client data stores 908 may be computer-readable media 704, employed to store information local to clients 906. On server-side 904, one or more servers 910 are responsive to server data stores 912. Like client data stores 908, server data stores 912 may include one or more computer-readable media 704, employed to store information local to servers 910.

Various aspects of a presentation system that is used to present interactive content to a user synchronously with media content have been described. It will be understood, however, that all of the described components of the presentation system need not be used, nor must the components, when used, be present concurrently. Functions/components described in the context of Presentation System 100 as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A method for playing media content using a presentation system, the media content arranged into a plurality of sets of media samples, each set of media samples receivable from a media source, the method comprising:
    at a first time, commencing play of a first set of media samples received from a first media source;
    identifying a second set of media samples receivable from a second media source, commencement of play of the second set of media samples scheduled at a second time occurring a predetermined amount of time from the first time;
    ascertaining a plurality of sets of static characteristics;
    based on an identity of the second media source, selecting one set of static characteristics from the plurality of sets of static characteristics;
    during play of the first set of media samples, ascertaining a dynamic characteristic of the presentation system;
    based on the selected set of static characteristics and the dynamic characteristic, determining a time offset value; and
    pre-rendering at least a portion of the second set of media samples at a pre-rendering time, the pre-rendering time offset from the second time by an amount based on the time offset value.

2. The method according to claim 1, wherein the pre-rendering time is selected to maximize play of the first set of media samples and to ensure that commencement of play of the second set of media samples occurs at the second time.

3. The method according to claim 1, wherein the first media source is the same as the second media source.

4. The method according to claim 1, wherein the step of determining the time offset value occurs after the first time but before the pre-rendering time, and wherein the step of determining the time offset value is repeated multiple times during play of the first set of media samples.

5. The method according to claim 1, further comprising the step of:
    adjusting the time offset value based on a processing load within the presentation system.

6. The method according to claim 1, wherein a static characteristic within a set of static characteristics is selected from the group comprising an encoder-decoder pair ("codec") parameter, an encryption parameter, a size of the second set of media samples, and a location of the second media source.

7. The method according to claim 1, wherein the dynamic characteristic comprises one of: a play state of the media content; a processing load within the presentation system; and a frequency of a clock associated with the presentation system.

8. The method according to claim 7, wherein when the dynamic characteristic comprises a play state of the media content, the play state of the media content is based on a play speed of the media content.

9. The method according to claim 8, wherein when the dynamic characteristic comprises a play state of the media content, the play state is based on an average of the play speed of the media content since the presentation system was turned on.

10. The method according to claim 1, wherein an identity of the first set of media samples is not ascertainable from a playlist.

11. The method according to claim 1, wherein the second time comprises one of: coinciding with an end of a play duration of the first set of media samples; occurring within a play duration of the first set of media samples; and occurring after an end of a play duration of the first set of media samples.

12. The method according to claim 1, wherein the first media source is the same as the second media source.

13. A system for playing media content, the media content arranged into a plurality of sets of media samples, each set of media samples receivable from a media source, the system comprising:
    a media content manager operable to play a first set of samples from a first media source and to play a second set of samples from a second media source; and
    a presentation manager having access to a playlist, an identity of the first set of media samples not ascertainable from the playlist, the presentation manager configured for communication with the media content manager, the presentation manager operable to
        ascertain an identity of the second set of media samples from the playlist,
        ascertain a static characteristic associated with the second media source,
        ascertain a dynamic characteristic during play of the first set of media samples,
        determine a time offset value based on the static characteristic and the dynamic characteristic, and
        arrange for pre-rendering of at least a portion of the second set of media samples at a pre-rendering time, the pre-rendering time offset from the second time by an amount based on the time offset value,
    wherein when the portion of the second set of media samples has been pre-rendered, the media content manager plays the pre-rendered portion of the second set of samples at the second time.

14. The system according to claim 13, wherein the presentation manager receives the static parameter from the media content manager.

15. The system according to claim 13, wherein the media content manager is operable to adjust the determined time offset value based on a processing load of the media content manager, wherein the presentation manager receives the adjusted time offset value from the media content manager, and wherein the pre-rendering time is offset from the second time by an amount based on the adjusted time offset value.

16. The system according to claim 13, wherein the system comprises an operating system.

17. The system according to claim 16, wherein the system comprises an optical disc player.

18. The system according to claim 17, wherein the optical disc player complies with specifications for high definition video published by the DVD Forum.

19. A method for playing media content using a presentation system, the media content arranged into a plurality of sets of media samples, each set of media samples receivable from a media source, the method comprising:

at a first time, commencing play of a first set of media samples received from a first media source;

identifying a second set of media samples receivable from a second media source, the second media source comprising a different device than the first media source, commencement of play of the second set of media samples scheduled at a second time occurring a predetermined amount of time from the first time;

ascertaining a static characteristic associated with the second media source;

during play of the first set of media samples, ascertaining a dynamic characteristic of the presentation system;

based on the static characteristic and the dynamic characteristic, determining a time offset value; and pre-rendering at least a portion of the second set of media samples at a pre-rendering time, the pre-rendering time offset from the second time by an amount based on the time offset value.

* * * * *